3,454,588
FLAME RETARDANT COATING COMPOSITION
Marion R. Lytton, West Chester, Pa., assignor to FMC Corporation, San Jose, Calif., a corporation of Delaware
No Drawing. Filed Mar. 2, 1966, Ser. No. 531,058
Int. Cl. C09d 5/18; D06m 15/26, 13/08
U.S. Cl. 260—29.6                            4 Claims

ABSTRACT OF THE DISCLOSURE

An aqueous flame retardant coating composition including a mixture of a flammable styrene polymer and $C_{2-3}$ alkylene monobromohydrin; and a cellulose acetate yarn impregnated with said composition, is disclosed herein.

---

Styrene containing polymers are widely used in coating compositions and the like. In certain applications, it is desirable that the flammable nature of these aromatic materials be suppressed. For example, styrene containing resins are used commercially as size materials for cellulosic yarns such as cellulose acetate. The yarn may be used in the manufacture of hair pieces or wigs for dolls. The cellulosic yarn itself is less flammable than rayon or cotton, however, the styrene polymer size coating will burn vigorously when ignited.

While many flame-retardant materials are known, their usefulness in combination with stryene polymers is limited. Certain problems attendant in the use of the styrene in the use of the stryene polymer as a coating material make the development of a flame-retardant composition difficult. In general, the styrene polymer must be incorporated in a liquid medium for effective application to a base material such as fiber or yarns. The liquid is preferably water or an aqueous medium containing an acidic or basic material to aid in the dissolving or dispersing of the resin. Thus, the flame-retardant material must not only be able to suppress the flammability of the styrene polymer but it must be capable of being dissolved or dispersed in the liquid medium containing the resin. It must be compatible with the resin without causing appreciable precipitation in the liquid medium, or detracting from other properties thereof.

It is an object of this invention to provide a flame-retardant composition containing a styrene polymer.

It is a further object of this invention to provide a flame-retardant composition containing a styrene polymer which is useful as a size for cellulosic yarns.

These and other objects are attained in accordance with this invention which is a flame-retardant coating composition comprising a mixture of a styrene polymer and at least 50%, based on the weight of said polymer, of a $C_{2-3}$ alkylene bromohydrin.

The styrene polymer of this invention is a flammable material generally consisting of polymers or interpolymers of styrene and styrene derivatives including for example, p-methyl styrene, o-methyl styrene, o-chloro-styrene and the dimethyl and dichloro substituted styrenes. Interpolymers of the styrene compounds are formed with other ethylenically unsaturated compounds including, for example, aliphatic alpha-beta monoolefinic carboxylic acids and their anhydrides such as maleic, citraconic, itaconic, crotonic, acrylic, methacrylic, and chloromaleic; methyl vinyl ketone, divinyl benzene, vinyl crotonate, acrylonitrile, butadiene, isoprene, alkyl acrylates, alkyl methacrylates and the like. The amount of styrene monomer and the particular comonomer employed to prepare the interpolymer will determine the degree of flammability of the resin, however, interpolymers containing as little as 10% by weight of the styrene monomer are included herein.

The $C_{2-3}$ alkylene bromohydrins include ethylene bromohydrin, propylene 2-bromohydrin and propylene 3-bromohydrin. Ethylene bromohydrin is preferred based on availability and ease of preparation. These bromohydrins are effective in retarding the flammability of the stryene containing polymers in amounts ranging from 50%, based on the weight of the styrene resin, and up. The degree of flammability of the particular styrene containing resin employed will determine, to a degree, the amount of bromohydrin which should be mixed therewith. Amounts of the bromohydrin in excess of 150% are generally uneconomical and unnecessary.

The coating composition is preferably prepared by incorporating the resin in an aqueous medium and adding the bromohydrin to the aqueous coating composition in the desired amount. Size compositions for yarns generally incorporate less than 10% of the styrene polymer in the aqueous coating preparation while coatings for other base materials may require as much as 40% of the resin in the aqueous medium. Certain styrene polymers require the addition of solubilizing or dispersing materials to prepare the aqueous coating composition. These materials, in moderate amounts, are included in the composition of this invention.

The following example is set forth to demonstrate this invention.

EXAMPLE

Concentrated ammonium hydroxide was added to warm water (60° C.) with stirring to provide 0.83% by weight of the hydroxide in solution. A resinous copolymer of about 50 parts styrene and 50 parts maleic anhydride was dissolved in this warm basic solution with stirring, to provide a resin concentration of 6.96%. To this size solution an equal part of ethylene bromohydrin, based on the weight of the resin, was added. The ethylene bromohydrin dissolved readily in the size solution.

A skein of cellulose acetate yarn was soaked in the size solution and hung up to dry overnight. A control skein was soaked in another size solution prepared in the same manner as set forth above except for the addition of ethylene bromohydrin. It was also hung up to dry overnight. After drying, both skeins were ignited with a wax taper. The control skein burned completely with considerable flaming, while the other burned when the taper was held to it but stopped burning shortly after the taper was removed. Cellulose acetate yarn, without a size coating, also stops burning as soon as the taper flame is removed from it.

Other materials were tried as flame retardants with little success. Many nitrogen-phosphorus compounds, which are normally effective in retarding the flammability of cellulose, were tried with no success. Chlorine analogs of the bromohydrins of this invention were tried and failed. Other bromine compounds which also emitted hydrogen bromide on ignition were tried but these generally caused excessive precipitation in the size solution or else failed to retard the flammability of the resin size.

Various changes and modifications may be made practicing the invention without departing from the spirit and

I claim:
1. A flame retardant coating composition comprising, in an aqueous medium, a mixture of a flammable styrene polymer and at least 50%, based on the weight of said polymer of a $C_{2-3}$ alkylene monobromohydrin.
2. The composition of claim 1 wherein said polymer is derived from monomers about 50% by weight of which styrene.
3. The composition of claim 1 wherein said alkylene bromohydrin is ethylene bromohydrin.
4. The composition of claim 1 as a water-dry size material impregnating a cellulose acetate yarn.

References Cited

UNITED STATES PATENTS

| 2,676,946 | 4/1954 | McCurdy et al. | 260—45.75 |
| 2,731,368 | 1/1956 | Fortess et al. | 117—145 |
| 3,219,640 | 11/1965 | Lee | 260—80.81 |

MURRAY TILLMAN, *Primary Examiner.*

W. J. BRIGGS, SR., *Assistant Examiner.*

U.S. Cl. X.R.

260—45.95; 117—137, 145